(12) United States Patent
Ott et al.

(10) Patent No.: US 10,951,511 B2
(45) Date of Patent: Mar. 16, 2021

(54) METHOD AND DEVICE FOR PROVIDING AN ADDRESS BY DEVICE TO BE MANAGED OF A NETWORK

(71) Applicant: ORANGE, Paris (FR)

(72) Inventors: Jean-Didier Ott, Crolles (FR); Jean-Yves Cloarec, Lannion (FR); Regine Basset, Crolles (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/312,876

(22) PCT Filed: Jun. 16, 2017

(86) PCT No.: PCT/FR2017/051571
§ 371 (c)(1),
(2) Date: Dec. 21, 2018

(87) PCT Pub. No.: WO2017/220894
PCT Pub. Date: Dec. 28, 2017

(65) Prior Publication Data
US 2019/0394116 A1 Dec. 26, 2019

(30) Foreign Application Priority Data
Jun. 22, 2016 (FR) ...................................... 1655808

(51) Int. Cl.
*H04L 12/00* (2006.01)
*H04L 12/715* (2013.01)
(Continued)

(52) U.S. Cl.
CPC .......... *H04L 45/04* (2013.01); *H04L 41/0213* (2013.01); *H04L 41/08* (2013.01);
(Continued)

(58) Field of Classification Search
CPC . H04L 41/0206; H04L 41/0213; H04L 41/08; H04L 45/74; H04L 61/2514; H04L 61/2564; H04L 61/2582
See application file for complete search history.

(56) References Cited

U.S. PATENT DOCUMENTS

2005/0175020 A1\* 8/2005 Park .................... H04L 12/4633
370/400
2012/0324063 A1\* 12/2012 Wang .................. H04L 41/0886
709/220
(Continued)

OTHER PUBLICATIONS

DSL-Home Technical Working Group: "DSL Forum TR-11; Applying TR-069 to remote management of home networking devices", Dec. 2005, XP002455794.
(Continued)

*Primary Examiner* — Phuc H Tran
(74) *Attorney, Agent, or Firm* — Haverstock & Owens LLP (57) ABSTRACT

The invention provides a provision method performed by a managed device (CPE4) of a first network (R1) to provide an address to a management device (ACS4) for managing the managed device and situated in a second network (R2), the address enabling the management device to request the establishment of a management session with the managed device, there being at least one intermediate device (CGN5) situated between the first and second networks, the method comprising:
  identifying a server (6) suitable for controlling the intermediate device;
  sending a request to the server to cause the intermediate device to set up static routing to the managed device to enable packets received by the intermediate device and addressed to a reachability address associated by the intermediate device with the managed device to be conveyed to a contact address of the managed device;
(Continued)

receiving a response from the server including the reachability address; and providing the management device with an address including the reachability address for use by the management device to request the setting up of a management session with the managed device.

11 Claims, 2 Drawing Sheets

(51) Int. Cl.
      *H04L 12/24*       (2006.01)
      *H04L 12/741*      (2013.01)
      *H04L 29/12*       (2006.01)

(52) U.S. Cl.
      CPC .......... *H04L 45/74* (2013.01); *H04L 61/2564* (2013.01); *H04L 61/2582* (2013.01)

(56) References Cited

U.S. PATENT DOCUMENTS

| | | | |
|---|---|---|---|
| 2014/0006584 A1 | 1/2014 | He | |
| 2015/0304179 A1* | 10/2015 | Huang | H04L 43/06 709/224 |
| 2016/0099837 A1* | 4/2016 | Visser | H04L 41/0806 709/221 |
| 2018/0191858 A1* | 7/2018 | Jennequin | H04L 12/2818 |

OTHER PUBLICATIONS

Wing D. et al., "Port Control Protocol (PCP); rfc6887.txt", Apr. 30, 2013, pp. 1-88, XP015090359.

Attach please find the International Preliminary Report for the PCT/FR2017/051571.

* cited by examiner

METHOD AND DEVICE FOR PROVIDING AN ADDRESS BY DEVICE TO BE MANAGED OF A NETWORK

BACKGROUND OF THE INVENTION

The invention relates to the general field of telecommunications.

The invention relates more particularly to managing equipment remotely, e.g. by a service provider.

In the context of their service offers, service providers such as telecommunications operators equip their customers with specific equipment that is adapted to the services they require. Such customer premises equipment (CPE) may for example comprise digital decoder boxes, also referred to as "set-top" boxes, that enable customers to use their terminals to access services involving television and video-on-demand, video phone terminals or voice-over-Internet protocol (IP) (or VoIP) in particular, gateways for accessing the Internet (also referred to as residential or home gateways), etc. Such equipment on customer premises is generally connected to a local network (e.g. a home local network or a business network) that is connected to the operator's network via a home router such as a residential or home gateway.

In order to optimize the quality of service offered customers, a service provider generally manages and maintains the various pieces of equipment placed by the provider with the customers. Such management relies in particular on sending updating or configuration messages to the equipment, and also on receiving information from the equipment concerning the state of the equipment.

In order to perform such remote administration, numerous service providers make use of the standardized CPE WAN management protocol (CWMP), also known as TR-069, and published by the Broadband Forum, in particular at the address http://www.broadband-forum.org/technical/download/TR-069 Amendment-5.pdf. Specifically, that protocol enables the service provider, by using an auto-configuration server (ACS), to have available a set of equipment management services comprising administration, control, performance tracking, and diagnostic services, while satisfying requirements for security, scalability, and independence from the manufacturer of the equipment.

The CWMP protocol is a protocol that relies on the internet protocol (IP), on the hypertext transfer protocol (http), and on the simple object access protocol (SOAP). During sessions sent between a piece of equipment and the ACS server in charge of managing it, orders are sent via the http or the https (HTTP Secure) protocol. These sessions are always initiated by the piece of equipment. Nevertheless, the protocol also provides a mechanism, known as a connection request mechanism, to allow the ACS server to initiate a session asynchronously with a piece of equipment in order to manage it. The principal steps of this mechanism are summarized briefly in FIG. 1.

Figure 1:
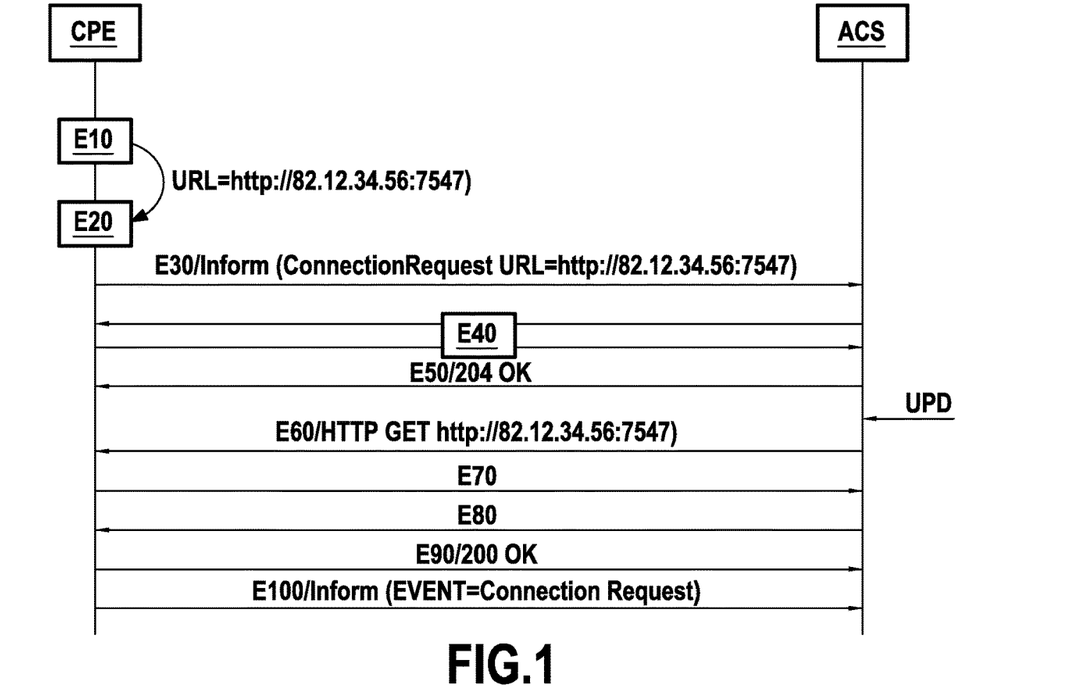
FIG. 1, described above, illustrates the connection request mechanism proposed by the CWMP protocol for managing equipment by means of its management device.

In general manner, each time customer premises equipment (CPE) starts (step E10), it opens an http server at an address or uniform resource locator (URL) (step E20). This URL comprises the Internet protocol (IP) address of the equipment (e.g. 82.12.34.56) and the port (e.g. 7547) where it can be reached in the local network to which it belongs, in particular in order to perform a connection request procedure. By way of example, the URL under consideration is http://82.12.34.56:7547.

Thereafter the CPE sends a CWMP Inform message to the ACS server to which it is attached and that serves to manage it, in other words to administer it (step E30). In this message, the CPE specifies its data model, which comprises in particular the URL of the http server that was opened in step E20 via which the ACS server can contact it in order to manage it. It should be observed that in the event of this URL changing, the CPE notifies the ACS server so that the ACS server always has an up-to-date URL available.

Dialog then takes place between the CPE and the ACS server in the session that has thus been set up (step E40), which session is closed by a 204 OK message sent by the ACS server to the CPE (step E50).

It is now assumed that the service provider seeks to perform an updating operation on the CPE via the ACS server. The connection request mechanism provided by the CWMP protocol for making this operation possible consists in sending an http GET request to the CPE at the URL provided by the CPE (step E60). In known manner in the http protocol, the GET method serves to request a resource.

In response to the request from the ACS server, there optionally follows authentication of the ACS server by the CPE (step E70) during which the ACS server provides an identifier and a password that have previously been shared between the CPE and the ACS server (step E80). Where appropriate, a 200 OK message is sent (step E90) by the CPE to the ACS server when it accepts the connection request as a result of the authentication being successful.

After this exchange and the successful authentication of the ACS server, the CPE responds to the request to set up a connection from the ACS server by attempting to initiate a session with the ACS server, and it sends an Inform message to the ACS server containing an event Event=ConnectionRequest (E100). Thereafter, the ACS server can administer the CPE remotely via the session that has been set up in this way and can request it to perform various actions by sending remote procedure call (RPC) commands for the purpose of updating it. For example, it may request the CPE to modify the configuration of one or more of its settings, to return the value of any one of its settings, etc.

In other words, in that connection request mechanism, the ACS server requests a connection with the CPE by visiting a URL provided by the CPE and after being identified by the CPE, where applicable. That mechanism thus assumes that the CPE is directly reachable for the ACS serve via the Internet protocol. It is therefore not directly applicable when the CPE is situated behind an address translation entity, also referred to as a network address translation (NAT) entity, or behind a network protection system such as a firewall.

Amendment 5 of the CWMP protocol defines various NAT traversal mechanisms making it possible to reach and manage CPEs that are attached to a home router that includes a NAT entity. Some of those mechanisms require special infrastructures to be installed. This applies for example to the NAT traversal mechanism described in Appendix G of the CWMP protocol that relies on the simple traversal of UDP through NATs (STUN) protocol and on the user datagram protocol (UDP). The mechanism provides for keeping a connection open with the STUN server by sending periodic messages to the server, this connection then being used by the ACS server to administer the CPE. This requires the presence of a STUN client in the equipment and the presence of a STUN server in the operator's ACS server. The same applies to the NAT traversal mechanism described in Appendix K of the CWMP protocol that relies on the extensible messaging and presence protocol (XMPP) and that requires a connection to be kept open with an XMPP server.

Appendix IV of the CWMP protocol proposes another NAT traversal mechanism based on using the universal plug-and-play (UPnP) Internet gateway device (IGD) protocol between the CPE and the home router including the NAT entity. That mechanism does not require any special external infrastructure, properly speaking. Nevertheless, its application is limited to managing CPEs situated behind the home router that includes the NAT entity and that provides access to the operator's network.

Since the UPnP IGD protocol is a protocol dedicated to the equipment in home local network, that mechanism cannot be used when the CPE that the operator is seeking to manage is the home router properly speaking, and when a NAT entity is to be found in the operator's network. Such a NAT entity, is commonly referred to as "operator NAT" or a carrier grade NAT (CGN) or a large scale NAT (LSN). It enables private or internal IP addresses to be given to the terminals of an operator's customer, e.g. their home routers (or gateways) instead of giving them public or external IP addresses, with these internal addresses being translated into external addresses on the Internet side. The translation may rely on translating ports so as to associate a single external address with numerous customers simultaneously. Such CGN or LSN entities are commonly used by operators for alleviating the shortage of IPv4 addresses, or for managing the transition between the IPv4 and IPv6 address systems, or indeed by the operators of mobile networks.

There therefore exists a need for a mechanism making it possible to administer a home router, or more generally a customer terminal, that is situated behind an intermediate device such as an operator NAT or a network protection system situated in an operator network.

OBJECT AND SUMMARY OF THE INVENTION

The invention satisfies this need by proposing a provision method performed by a managed device of a first telecommunications network to provide an address to a management device for managing the managed device and situated in a second telecommunications network, the address enabling the management device to request the establishment of a management session with the managed device, there being at least one intermediate device situated between the first and second telecommunications networks, the provision method comprising:
  an identification step for identifying a server suitable for controlling the intermediate device;
  a send step for sending a request to the server to cause the intermediate device to set up static routing to the managed device to enable packets received by the intermediate device and addressed to a reachability address associated by the intermediate device with the managed device to be conveyed to a contact address of the managed device;
  a reception step for receiving a response from the server including said reachability address associated by the intermediate device with the managed device; and
  a provision step for providing the management device with an address including the received reachability address, said address being for use by the management device to request the setting up of a management session with the managed device.

Correspondingly, the invention also provides a managed device of a first telecommunications network that is managed by a management device situated in a second telecommunications network, the managed device comprising:
  an identification module configured to identify a server suitable for controlling an intermediate device situated between the first and second telecommunications networks;
  a send module configured to send to the server a request for the intermediate device to set up static routing to the managed device enabling packets received by the intermediate device and addressed to a reachability address associated by the intermediate device with the managed device to be conveyed to a contact address of said managed device;
  a reception module suitable for receiving a response from the server, the response including the reachability address associated by the intermediate device with the managed device; and
  a provision module configured to provide the management device with an address comprising the received reachability address, said address being for use by the management device in order to request the setting up of a management session with the managed device.

The term "reachability address" is used to mean an address that enables the managed device to be reached. In particular, this address may comprise an Internet protocol (IP) address together with a port allocated to the managed device, or it may merely comprise an IP address.

The provision method for providing an address stems from a problem that has been observed in managing a home router in a first network. Nevertheless, it is applicable to managing any device of the first network and having a management device that is located in a second network that is separated from the first network by an intermediate device.

By way of illustration, the first network may for example be the network of the operator in charge of managing the managed device, and the intermediate device may be an operator NAT or a network protection system forming an interface between the first and second telecommunications networks. The intermediate device is thus in series between the managed device and the management device. The intermediate device may equally well be in the second network or in another network situated between the first and second networks.

The invention thus proposes a mechanism that is very simple and easy to implement that enables an operator (or a service provider) to administer a device that is situated behind an operator NAT or network protection system located in the operator network. The mechanism relies on setting up an exchange between the managed device and a server that is suitable for controlling the intermediate device in order to set up static routing to the managed device. Setting up this static routing enables the managed device to obtain a reachability address that is accessible to equipment located upstream from the intermediate device (upstream relative to "incoming" messages, i.e. messages addressed to the managed device). In other words, by means of the reachability address allocated to the managed device by the intermediate device when setting up the static routing, the managed device becomes reachable from the second network even in the presence of an operator NAT and/or a network protection system in that network. The managed device is thus a fortiori reachable at this address by its management device (i.e. by its ACS device when using the CWMP protocol). The managed device communicates the reachability address to the management device, e.g. in the context of applying the CWMP protocol, as the URL of the "Connection Request" as a replacement for its contact address (which is internal or private to the first network), thereby enabling the management device subsequently to cause a management session to be set up by the managed device using the "Connection Request" procedure.

The invention thus provides a simple solution that serves to mitigate the shortcomings of the UPnP IGD protocol which, as mentioned above, is applicable only within a local network, and which, furthermore, is of small size because of the discovery messages that are sent by the various pieces of equipment of the network within that network in order to discover the UPnP IGD gateway from which they depend. Applying that protocol to a network of large size would lead to large streams of messages coming from all of the pieces of equipment, which cannot be envisaged in practice. In addition, in the UPnP IGD protocol, the broadcasting of discovery messages remains internal to the home network. Those messages are not intended to pass through the routers of the network and they cannot be conveyed outside the home network. On the contrary, the invention makes it possible to manage situations in which the managed device and its management device are situated in different networks, without limitation as to the nature or the size of those networks.

In addition, present implementations of the UPnP IGD protocol present a relatively low level of security, in particular because of its use restricted to managing devices that are to be found within a home network. By having recourse to an exchange between the managed device and a server suitable for controlling the intermediate device acting as an interface between the two networks, the invention makes it easy to implement stricter security rules (e.g. having recourse to authentication and/or encryption procedures, etc.).

In a preferred implementation, the performance of the invention relies on the port control protocol (PCP) as defined by the Internet engineering task force (IETF) in Document RFC 6887: the server suitable for controlling the intermediate device is a PCP server, and the managed device and the server communicate by using the PCP protocol. In other words, the setup request and the response received from the server are both in compliance with the PCP protocol in this implementation.

In known manner, the PCP protocol is a protocol in widespread use that makes it easy to control a NAT entity or a network protection system, e.g. in order to establish static routing to a customer machine by opening an entry port on the NAT entity or on the network protection system for the customer machine. The use of this protocol thus makes the invention easier to perform, since it does not require any specific protocol or infrastructure, and since it is transparent for the management device.

The mechanism proposed by the invention is thus entirely compatible with the existing CWMP and PCP protocols.

The server suitable for controlling the intermediate device may be identified in various ways.

Thus, in a particular implementation, the method includes a prior static or dynamic configuration step for configuring the managed device with an address of the server suitable for controlling the intermediate device.

This configuration can be implemented by a user of the managed device or by the device in question, e.g. when it starts and communicates with its management device. Thus, in particular, the prior configuration step for configuring the managed device may comprise receiving a data model from the management device and including the address of the server.

In another implementation, the identification step for identifying the server comprises the managed device interrogating a dynamic host configuration (DHCP) protocol server and receiving an address of the server from the DHCP server.

In combination with using the PCP protocol, this implementation takes advantage of already-existing options in the DHCP protocol that give access to an address of the PCP server controlling the intermediate device.

As mentioned above, the invention is advantageously applicable in a context where the intermediate device of the second telecommunications network is an operator NAT or a network protection system, such as a firewall.

In a particular implementation in which the intermediate device is an address translation device situated in the second telecommunications network, setting up permanent routing comprises the intermediate device creating an association of addresses, this association of addresses associating a private address of the managed device (an address that is internal in the meaning of Document RFC 6887) with a public address that is reachable by the management device for managing the managed device, constituting the reachability address of the managed device (an external address in the meaning of Document RFC 6887).

In other words, static routing is set up by opening a port for incoming messages addressed to the managed device.

In a particular embodiment, the various steps of the provision method are determined by computer program instructions.

Consequently, the invention also provides a computer program on a data medium, the program being suitable for being performed by a management device or more generally by a computer, the program including instructions adapted to performing steps of a provision method as described above.

The program may use any programming language, and be in the form of source code, object code, or code intermediate between source code and object code, such as in a partially compiled form, or in any other desirable form.

The invention also provides a computer-readable data or recording medium that includes instructions of a computer program as mentioned above.

The data or recording medium may be any entity or device capable of storing the program. For example, the medium may comprise storage means, such as a read only memory (ROM), e.g. a compact disk (CD) ROM or a microelectronic circuit ROM, or indeed magnetic recording means, e.g. a floppy disk or a hard disk.

Furthermore, the data or recording medium may be a transmissible medium such as an electrical or optical signal suitable for being conveyed via an electrical or optical cable, by radio, or by other means. The program of the invention may in particular be downloaded from an Internet type network.

Alternatively, the data or recording medium may be an integrated circuit in which the program is incorporated, the circuit being adapted to execute or to be used in the execution of the method in question.

The invention also provides a communications system comprising:
- a managed device in a first telecommunications network as described above;
- a management device for managing the managed device and situated in a second telecommunications network;
- an intermediate device situated between the first and second telecommunications networks; and
- a server suitable for controlling the intermediate device.

The system benefits from the same advantages as the provision method and the managed device, as mentioned above.

In other implementations, it is also possible to envisage that the provision method, the managed device, and the communications system of the invention present in combination all or some of the above-specified characteristics.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF THE INVENTION

Figure 2:
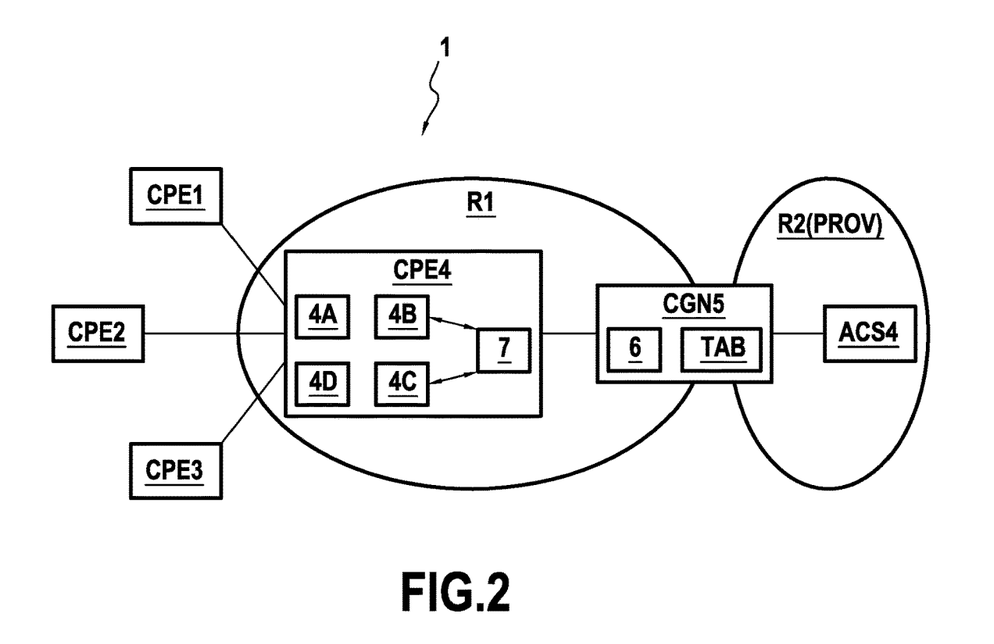
FIG. 2 shows a particular embodiment of communications system in accordance with the invention in its environment.

FIG. 2 shows a communications system 1 in accordance with the invention in its environment, in a particular embodiment that is applied to a home router as a managed device.

In the example shown in FIG. 2, the communications system 1 comprises a plurality of pieces of equipment or devices (CPEs) that are connected to one another via a local communications network or a business communications network such as a wireless local area network (WLAN). By way of example, the equipment in the local network may comprise a voice-over-IP terminal CPE1, a video phone terminal CPE2, and a digital decoder box (or "set-top" box) CPE3. These pieces of equipment are attached to a home router CPE4 of the communications system 1 and in accordance with the invention, that is in turn connected to a telecommunications network R1 (which router is also known as a gateway giving access to the network R1 or as a home gateway). By way of example, the network R1 is another LAN or else a wide area network (WAN).

Nevertheless, no limitation is attached to the nature or the number of pieces of equipment included in the local network nor on the nature of the network. For example, the network could alternatively be a wired network or WLAN.

In the embodiment shown in FIG. 2, each of the pieces of equipment CPE1, CPE2, CPE3, and CPE4 is administered by a management device or ACS server using the CWMP or TR-069 protocol. In particular, the piece of equipment CPE4 is managed by a management device or ACS server ACS4. The management of each piece of equipment by an ACS server includes in particular updating software (e.g. firmware) in the equipment, tracking its state and its performance, etc. It is assumed at this point that all of the ACS servers are administered by the same operator (or service provider) PROV and that they belong to a network R2 of the operator PROV that is distinct in this example from the local network and from the network R1. By way of example, the network R2 is a WAN.

In another embodiment, all of the equipment is managed by a single ACS server, or a plurality of pieces of equipment are managed by a single ACS server, etc.

The home router CPE4 provides the interface between the local network and the telecommunications network R1. In the example shown in FIG. 2, the communications system 1 also has an operator NAT entity CGN5 situated at the interface between the network R1 and the network R2. The operator NAT CNG5 is an intermediate device in the meaning of the invention that is placed at the entry to the network R2, i.e. in series between the home router CPE4 and its management device ACS4. It performs an address translation mechanism (NAT) that, in this example, matches internal (private) and non-routable IP addresses and ports of the network R1 (i.e. addresses that cannot be reached by equipment placed upstream from the operator NAT CGN5, and in particular cannot be reached from the network R2) with a set of external (public) and Internet-routable IP addresses and ports (i.e. accessible from the network R2 or from the public Internet). In the description below, the terms "private" and "internal" are used interchangeably to designate an internal port or IP address of the network R1 that is not routable over the Internet; likewise, the terms "public" and "external" are used interchangeably to designate a port or an IP address of the network R2 that is routable over the Internet.

The matching IP addresses and ports are stored in a correspondence table TAB in a non-volatile memory of the NAT entity CGN5. Such a mechanism is itself known and is not described in detail herein.

It should be observed that the operator NAT CGN5 situated at the interface between the "internal" network R1 and the "external" network R2 does not exclude the existence of a NAT entity being situated at the interface between the home network and the network R1, e.g. in the home router CPE4, with such a NAT entity translating addresses between internal (private) addresses of the local network and internal (private) addresses of the network R1. The combination of these two NAT entities is also referred to as NAT444.

Furthermore, in the present example, the operator NAT CGN5 is situated at the interface between the internal network R1 and the external network R2 in which the management device ACS4 for managing the router CPE4 is to be found. Nevertheless, the invention applies equally well when the operator NAT CGN5 is in a third external network distinct from the external network R2 and situated between the networks R1 and R2.

In addition, the invention is not limited to the sole situation where the operator NAT CGN5 translates between internal (private) addresses and external (public) addresses. In a variant, the address translation performed by the operator NAT CNG5 may consist in translating IPv4 addresses into IPv6 addresses, or vice versa. Such a NAT is also known by the term DS-Lite CGN.

Attention is given more particularly to managing the home router CPE4 by means of its management device ACS4. Because the address translation mechanism is performed by the operator NAT CGN5, the home router CPE4 is not directly reachable by some other device situated upstream from the operator NAT CGN5 in a network external to the network R1, typically in the network R2. By way of example, the home router CPE4 that has an internal contact address in the network R1 comprising an internal (i.e. private) port PORT4int (e.g. PORT4int=15200) and an internal (i.e. private) IP address @IP4int (e.g. @IP4int=172.200.100.1) in the network R1 is not directly reachable by its management device ACS4 at that address (no IP reachability), since the management device is on the other side of the operator NAT CGN5 relative to the router CPE4. In the present description, the management device ACS4 is said to be located "upstream" from the operator NAT CGN5, as contrasted with the router CPE4 which is located behind the operator NAT CGN5 or "downstream"

therefrom (this convention relies on the flow direction of "incoming" messages, i.e. messages sent to the router CPE4).

In order to enable the home router CPE4 to be managed in the absence of such IP reachability, the home router CPE4 is configured to perform a provision method for providing an address to its management device ACS4 in accordance with the invention. This method relies in particular on an exchange between the home router CPE4 and a server 6 suitable for controlling the operator NAT CGN5. In the presently-described implementation, this exchange is carried out in compliance with the PCP control protocol: for this purpose, the home router CPE4 includes a PCP client 7 and the server 6 is a PCP server, which is included in this example for simplification purposes in the operator NAT CGN5.

In a variant, the server 6 may be hosted by a physical entity that is distinct from the operator NAT CGN5 and that is suitable for communicating therewith.

The PCP protocol is itself known. As mentioned above, PCP is a commonly-used protocol that makes it easy to control a NAT entity or a network protection system, e.g. in order to set up static routing to a customer machine by opening an entry port (i.e. a reachability address comprising an IP address and an entry port) for that customer machine on the NAT entity or on the network protection system controlled by the PCP server. In the presently-described implementation, this protocol is used by the home router CPE4 and by the PCP server 6 in order to set up static routing in the operator NAT CGN5 to the home router CPE4, as described in greater detail below. The PCP protocol is described in Document RFC 6887 entitled "Port control protocol (PCP)", April 2013, published by the IETF, and it is not described in greater detail herein.

The router CPE4, the management device ACS4 of the router CPE4, the NAT entity CGN5, and the PCP server 6 all form part of the communications system 1.

Figure 3:
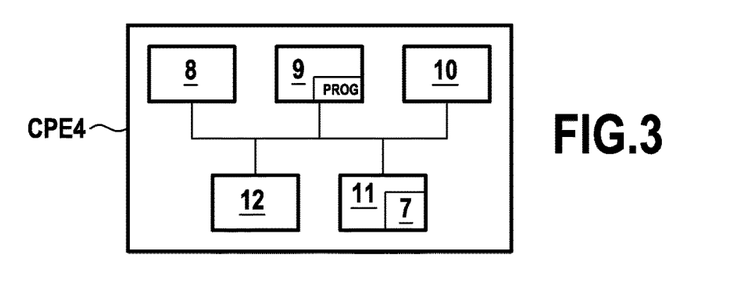
FIG. 3 is a diagram showing the hardware architecture of a management device in the FIG. 1 communications system.

In the presently-described embodiment, the router CPE4 has the hardware architecture of a computer. As shown in FIG. 3, it comprises in particular a processor 8, a random access memory (RAM) 9, a ROM 10, a non-volatile memory 11, and a communications module 12. The communications module 12 enables the router CPE4 to communicate with the other pieces of equipment CPE1-CPE3 of the local network and also with its management device ACS4 and with the server 6 located in the network R2. By way of example, for this purpose this module comprises a network card, a WLAN modem, etc.

The non-volatile memory 11 of the router CPE4 includes the above-mentioned PCP client 7. Furthermore, the ROM 10 of the router CPE4 constitutes a data medium in accordance with the invention that is readable by the processor 8 and that stores a computer program PROG in accordance with the invention including instructions for executing steps of an address provision method of the invention.

In equivalent manner, in this example the computer program PROG defines functional and software modules that are configured to perform the steps of an address provision method of the invention. These functional modules rely on or control the above-mentioned hardware elements 8-12 of the router CPE4 and also the PCP client 7. In particular, in this example they comprise:

an identification module 4A configured to identify the server 6 controlling the operator NAT CGN5 situated between the networks R1 and R2, i.e. in series between the router CPE4 and its management device ACS4;

a send module 4B, configured to send a request to the server 6 to cause the operator NAT CGN5 to set up static routing to the router CPE4 so as to enable packets received by the operator NAT CGN5 to be conveyed to a reachability address (comprising in this example an IP address and a port) that is associated by the operator NAT CGN5 with the router CPE4 to a contact address of the router. This send module relies in particular on the PCP client 7 and on the communications module 12 of the router CPE4;

a reception module 4C suitable for receiving a response from the server 6 including the reachability address allocated by the operator NAT CGN5 to the router CPE4 in response to the request to set up the static routing. This reception module also relies on the PCP client 7 and on the communications module 12 of the router CPE4; and a provision module 4D configured to use the CWMP protocol in this example in order to provide the management device ACS4 with an address comprising the received reachability address for use by the management device ACS4 in order to request setting up a management session with the router in the context of a connection request procedure.

The functions of these various modules are described in greater detail below with reference to FIG. 4.

Figure 4:
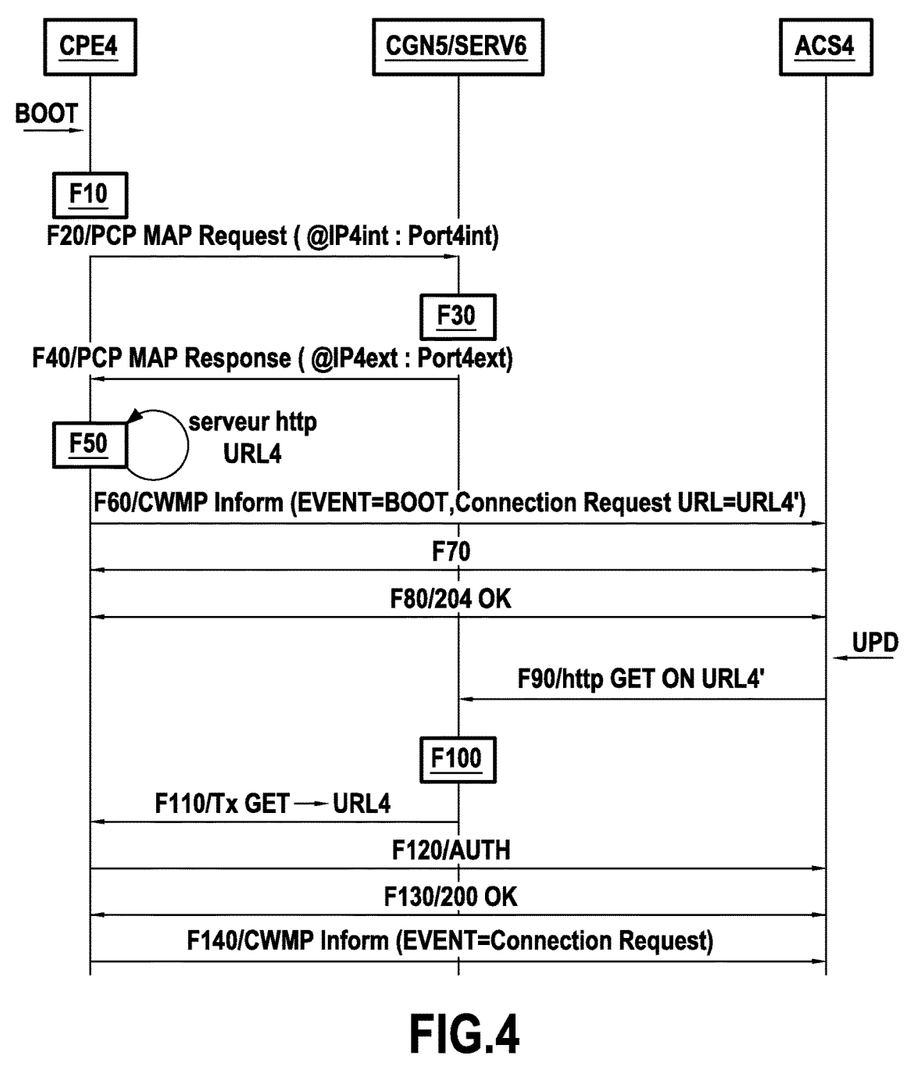
FIG. 4 shows the main steps of a provision method of the invention, as performed by the FIG. 3 management device.

FIG. 4 shows the main steps of an address provision method of the invention as implemented by the router CPE4 in order to enable it to be administered by the management device ACS4 even in the presence of the intermediate device CGN5, which device is arranged in series between the router CPE4 and the management device ACS4.

In the presently-described implementation, the address provision method of the invention is preceded by a prior configuration stage (step F10) that is performed in this example as a result of the router CPE4 starting ("BOOTING"). This prior stage consists in configuring the router CPE4 with the address @IP6 of the PCP server 6. By way of example, this may be configuration performed as a result of a user taking action via a graphics interface provided for this purpose on the router CPE4.

In a variant, the router CPE4 may be statically configured with the address @IP6 of the PCP server 6 prior to being installed with the customer user.

In another variant, it is possible to envisage dynamically configuring the router CPE4 with the address @IP6 of the server 6. For example, on starting, the router CPE4 may be configured to identify the PCP server 6 in dynamic manner by using the DHCP protocol. More particularly, in this variant, the identification module 4A of the router CPE4 is configured to interrogate an DHCP server of the network R1 (not shown in FIG. 2) so as to obtain an IP address for the PCP server 6. By way of example, it relies on options provided for this purpose by the DHCP protocol (e.g. OPTION_V4_PCP_SERVER for an IPv4 address), as described in particular in the Document RFC 7291 entitled "DHCP options for the port control protocol (PCP)", published in July 2014 by the IETF.

In yet another variant, the router CPE4 is configured with the address @IP6 of the PCP server 6 during a session set up between the home router CPE4 and its management device ACS4 on starting the router CPE4 and at the initiative of the router CPE4, with the management device ACS4 supplying the home router CPE4 during this session with a data model that includes a reachability address (i.e. the IP address @IP6) of the PCP server 6.

Once the router CPE4 is configured, the IP address @IP6 of the server 6 is stored by the home router CPE4 in its non-volatile memory 11. This configuration of the router CPE4 enables the identification module 4A to identify the PCP server 6 controlling the operator NAT CGN5 placed in series between itself and its management device ACS4.

After the identification module 4A has identified the PCP server 6, the send module 4B of the router CPE4 uses the PCP client 7 to send to the PCP server 6 a request for the operator NAT CGN5 to set up static routing to the router CPE4 for messages that are addressed to that router that are received by the operator NAT CGN5 (step F20). This request, sent to the address @IP6 of the PCP server 6 is in accordance with the PCP protocol: it is a PCP MAP request message containing the contact address of the router CPE4, comprising the private (internal) IP address @IP4int and the private (internal) port PORT4int. By means of this request, the router CPE4 requests the PCP server 6 installed with the operator NAT CGN5 to open a static incoming connection on the NAT CGN5.

On receiving this request, possibly after various prior verification steps (e.g. matching between the address of the router CPE4 and the source address of the request, etc.), the PCP server 6 sets up the requested static routing in the operator NAT CGN5 to the home router CPE4 (step F30).

For this purpose, it gives the router CPE4 a public (external) IP address, @IP4ext, and a public (external) port, PORT4ext, in the network R2 (i.e. routable from the Internet). The public IP address @IP4ext and the public port PORT4ext constitutes a reachability address of the router CPE4 in the meaning of the invention. By way of example, @IP4ext=193.253.100.122 and PORT4ext=50815.

Thereafter, the PCP server 6 creates an association in the correspondence table TAB maintained by the operator NAT CGN5 for the router CPE4, this address association associating the pair comprising the private IP address @IP4int and the private port PORT4int (i.e. the contact address of the router CPE4) with the pair comprising the public IP address @IP4ext and the public port PORT4ext (in other words the reachability address for the router CPE4).

In a variant, if the operator NAT CGN5 translates IPv4 addresses into IPv6 addresses, or vice versa, the association stored in the NAT correspondence table associates the IPv4 address of the router CPE4 with an IPv6 address allocated to the router CPE4, or vice versa.

Thereafter, the PCP server 6 responds to the request from the router CPE4 by sending it the public IP address @IP4ext and the public port PORT4ext that have been allocated thereto in a PCP MAP response message (step F40). In the presently-described implementation, after the reception module 4C (and the PCP client 7) of the router CPE4 have received the public or external reachability address that has been allocated thereto, the router CPE4 opens an http server at an address (or URL) URL4 (step F50). The address URL4 is a URL comprising the contact address of the router CPE4, i.e. the private IP address @IP4int and the private port PORT4int of the router CPE4, together with a path that is managed in random manner to the http server (e.g. YmTzX21MLY). The path to the http server is stored by the router CPE4. By way of example, the address URL4 is URL4=http://172.20.100.1:15200/YmTzX21MLY. The http server as opened in this way may be protected by an identifier ID and by a password PWD that are shared with the management device ACS4. No limitation is associated with the way in which this sharing is undertaken (identifier and password hard-coded in both devices, secure exchange, etc.).

It should be observed that the step F50 of opening the http server by the router CPE4 may be performed before the router CPE4 has received the public reachability address that has been allocated thereto, e.g. on starting ("BOOTING"). It is not necessarily correlated with the step F50.

Thereafter the router CPE4 acts via its send module 4D to send a CWMP Inform message to its management device ACS4 (step F60). In this message it specifies its data model that includes the address ("ConnectionRequestURL") of the http server at which the management device ACS4 can contact it in order to set up a management session. Nevertheless, in accordance with the invention, since the address URL4 is not reachable by the management device ACS4 because of the presence of the operator NAT CGN5 (private IP address @IP4int and private port PORT4int not being reachable directly from some other device situated upstream from the operator NAT CGN5), the send module 4D replaces the address URL4 at which the http server has been opened in the CWMP Inform message with an address URL4' comprising the external reachability address that has been given thereto, together with the path to the http server. For example, URL4'=http://193.253.100.122:50814/YmTzX21MLY. The router CPE4 stores the path to the http server in association with the URL URL4'.

The CWMP Inform message sent by the send module 4D is thus a CWMP Inform message having as its parameter event=BOOT and containing the address URL4' as its URL for use by the management device ACS4 for setting up a management session with the router CPE4 (i.e. the address ConnectionRequestURL=URL4').

The management device ACS4 stores the URL URL4' in its non-volatile memory for possible future management sessions with the router CPE4, and then dialog follows between the router CPE4 and the server ACS4 (step F70), which dialog is closed by a 204 OK message sent by the management device ACS4 to the home router CPE4 (step F80).

It is now assumed that an intervention (e.g. updating firmware "UPD" or communication) needs to be carried out by the operator PROV on the home router CPE4.

For this purpose, the management device ACS4 sets up an asynchronous management session with the router CPE4 by having recourse to a conventional "connection request" procedure as specified by the CWMP protocol and as described in particular in the above-mentioned Document TR-069. In order to perform this procedure, it uses the address URL4' that was previously provided thereto by the home router CPE4 and that is reachable by the management device ACS4 in spite of the presence of the operator NAT CGN5 between those two pieces of equipment.

More particularly, and in compliance with the "connection request" procedure, the management device ACS4 sends an http GET request for the URL URL4' as provided by the router CPE4 to the router CPE4 via its external reachability address (step F90). In known manner in the http protocol, the GET method serves to request a resource.

This http GET request is intercepted by the operator NAT CGN5 that is located in series in exchanges between the management device ACS4 and the router CPE4 (step F100). The operator NAT CGN5 identifies the address association stored for this router CPE4 in the correspondence table TAB. From this association, it obtains the internal contact address @IP4int and PORT4int of the router CPE4, and in the IP header of the http GET request it replaces the external reachability address (@IP4ext, PORT4ext) with the internal address (@IP4int, PORT4int). The GET request is then forwarded by the operator NAT CGN5 to the router CPE4 after address translation has been performed (step F110).

In this implementation, on the router CPE4 receiving the GET request, the router CPE4 carries out authentication of the management device ACS4, during which the management device ACS4 provides the identifier and the password as previously shared between the router CPE4 and the management device ACS4 (step F120). A 200 OK message is sent by the router CPE4 to the management device ACS4 if the authentication is successful (F130).

Following this exchange and successful authentication of the management device ACS4, the router CPE4 interprets the GET request it has received (and containing the path to the http server opened by the router CPE4) as being a request to set up a management session by the management device ACS4, and it responds by attempting to initiate the session therewith, by sending a CWMP Inform message containing an event 6 "CONNECTION REQUEST" (F140). Thereafter, the management device ACS4 can begin a remote session of administering the router CPE4 as it sees fit via the session set up in this way and it can request it to perform various actions by means of remote procedure call (RPC) commands for the purpose of updating it. For example, it can request it to modify the configuration of one or more settings, to return the value of one of its settings, etc.

In the presently-envisaged implementation, the invention is described with reference to the CWMP protocol. Nevertheless, it applies equally to other protocols for remotely managing equipment that operate in similar manner to CWMP (sessions set up at the initiative of pieces of equipment, publication of a connection address for triggering a connection between a piece of equipment and its administration server, etc.), and in particular proprietary protocols. A preferred application of the invention lies in protocols that rely on the http protocol, such as the CWMP protocol.

In addition, the invention is described by taking as its example of a managed device the router CPE4 that is situated at the interface between the local network and the network R1. This assumption is not itself limiting on the invention, which may apply to any type of managed device that is placed behind an intermediate device such as the operator NAT CGN5, like the router CPE4.

Furthermore, in the example shown in FIG. 2, consideration is given to an operator NAT CGN as the intermediate device between the router CPE4 and its management device ACS4, thereby impeding direct IP reachability of the router CPE4 by the management device ACS4. Nevertheless, the invention is equally applicable to other contexts. For example, the intermediate device in series between the router CPE4 and its management device ACS4 may be a network protection device, such as a firewall, that is to be found at the interface between the network R1 and the operator network R2. The steps of the provision method are then identical or similar to those described above with reference to FIGS. 2 to 4 (the context is then one in which during the step F30, the network protection device uses its PCP server to open a static connection for the router CPE4 (setting up static routing), in other words, it allows incoming streams to go to the router CPE4 by giving it an authorized external address and an authorized external entry port).

The invention claimed is:

1. A provision method performed by a managed device of a first telecommunications network to provide an address to a management device for managing said managed device and situated in a second telecommunications network, the address enabling said management device to request the establishment of a management session with the managed device, there being at least one intermediate device situated between the first and second telecommunications networks, the provision method comprising:
   an identification step for identifying a server suitable for controlling the intermediate device;
   a send step for sending a request to the server to cause the intermediate device to set up static routing to the managed device to enable packets received by the intermediate device and addressed to a reachability address associated by the intermediate device with the managed device to be conveyed to a contact address of said managed device;
   a reception step for receiving a response from the server including said reachability address associated by the intermediate device with the managed device; and
   a provision step for providing the management device with an address including the received reachability address, said address being for use by the management device to request the setting up of a management session with the managed device.

2. A provision method according to claim 1, wherein the setup request and the response received from the server comply with the port control protocol (PCP), and the server suitable for controlling the intermediate device is a PCP server.

3. A provision method according to claim 1, including a prior configuration step for configuring the managed device with an address of the server suitable for controlling the intermediate device.

4. A provision method according to claim 3, wherein the prior configuration step for configuring the managed device comprises receiving a data model from the management device and including the address of the server.

5. A provision method according to claim 1, wherein the identification step for identifying the server comprises the managed device interrogating a dynamic host configuration protocol server and receiving an address of the server from the DHCP server.

6. A provision method according to claim 1, wherein the intermediate device is an address translation device, and setting up static routing comprises the intermediate device creating an address association, the address association associating an internal address of the managed device with an external address reachable by the management device for managing the managed device and constituting said reachability address.

7. A provision method according to claim 1, wherein the intermediate device is a network protection device.

8. A non-transitory computer-readable medium comprising a computer program including instructions for executing steps of a provision method when said program is executed by a computer, the provision method comprising:
   an identification step for identifying a server suitable for controlling an intermediate device;
   a send step for sending a request to a server to cause the intermediate device to set up static routing to a managed device to enable packets received by the intermediate device and addressed to a reachability address associated by the intermediate device with the managed device to be conveyed to a contact address of said managed device;
   a reception step for receiving a response from the server including said reachability address associated by the intermediate device with the managed device; and
   a provision step for providing the management device with an address including the received reachability address, said address being for use by the management device to request the setting up of a management session with the managed device.

9. A non-transitory computer-readable medium comprising a computer-readable data medium storing a computer program including instructions for executing steps of a provision method, the provision method comprising:
an identification step for identifying a server suitable for controlling an intermediate device;
a send step for sending a request to a server to cause the intermediate device to set up static routing to a managed device to enable packets received by the intermediate device and addressed to a reachability address associated by the intermediate device with the managed device to be conveyed to a contact address of said managed device;
a reception step for receiving a response from the server including said reachability address associated by the intermediate device with the managed device; and
a provision step for providing the management device with an address including the received reachability address, said address being for use by the management device to request the setting up of a management session with the managed device.

10. A managed device of a first telecommunications network that is managed by a management device situated in a second telecommunications network, the managed device comprising:
a non-transitory computer-readable medium configured to store an application, the application comprising:
an identification module configured to identify a server suitable for controlling an intermediate device situated between the first and second telecommunications networks;
a send module configured to send to the server a request for the intermediate device to set up static routing to the managed device enabling packets received by the intermediate device and addressed to a reachability address associated by the intermediate device with the managed device to be conveyed to a contact address of said managed device;
a reception module suitable for receiving a response from the server, the response including said reachability address associated by the intermediate device with the managed device; and
a provision module configured to provide the management device with an address comprising the received reachability address, said address being for use by the management device in order to request the setting up of a management session with the managed device; and
a processor configured to process the application.

11. A communications system comprising:
a managed device in a first telecommunications network, the managed device comprising:
a non-transitory computer-readable medium configured to store an application, the application comprising:
an identification module configured to identify a server suitable for controlling an intermediate device situated between the first telecommunications network and a second telecommunications network;
a send module configured to send to the server a request for the intermediate device to set up static routing to the managed device enabling packets received by the intermediate device and addressed to a reachability address associated by the intermediate device with the managed device to be conveyed to a contact address of said managed device;
a reception module suitable for receiving a response from the server, the response including said reachability address associated by the intermediate device with the managed device; and
a provision module configured to provide a management device with an address comprising the received reachability address, said address being for use by the management device in order to request the setting up of a management session with the managed device;
the management device for managing the managed device and situated in a second telecommunications network;
the intermediate device situated between the first and second telecommunications networks; and
the server suitable for controlling the intermediate device; and
a processor configured to process the application.

* * * * *